United States Patent [19]

McClure

[11] 4,422,692

[45] Dec. 27, 1983

[54] SIMULATED WIRE WHEEL TRIM FOR AUTOMOBILE WHEELS

[75] Inventor: Don W. McClure, Sterling Heights, Mich.

[73] Assignee: Rockwell International Corporation, Pittsburgh, Pa.

[21] Appl. No.: 267,166

[22] Filed: May 26, 1981

[51] Int. Cl.³ .............................................. B60B 7/00
[52] U.S. Cl. .................................. 301/37 SS; 301/104
[58] Field of Search ................ 301/37 SS, 37 R, 104; 29/159 A

[56] References Cited

U.S. PATENT DOCUMENTS

| 1,432,191 | 10/1922 | Lachman | 301/37 SS |
| 2,709,113 | 5/1955 | Plofkin | 301/37 SS |
| 2,710,775 | 6/1955 | Buerger | 301/37 SS |
| 3,967,855 | 7/1976 | Johnson | 301/37 R |
| 4,168,016 | 9/1979 | Marshall | 301/37 SS |
| 4,178,043 | 12/1979 | Beisch et al. | 301/37 SS |
| 4,229,048 | 10/1980 | Brinson | 301/37 SS |

Primary Examiner—H. Grant Skaggs

[57] ABSTRACT

A simulated wire wheel cover is provided which utilizes an integral array of spokes to provide the structural support for the other members. The spoke array is composed of a plurality of interconnected spoke members. A central hub member is fastened to the central portion of the spoke array. A circular rim member engages and is held in position by the outer ends of the spokes in the spoke array. The rim member is provided with integral retainers for retaining the wheel cover on the vehicle wheel.

9 Claims, 8 Drawing Figures

SIMULATED WIRE WHEEL TRIM FOR AUTOMOBILE WHEELS

BACKGROUND OF THE INVENTION

1. Field of the Invention

This invention relates to a simulated wire wheel cover for use on automobiles. More particularly, an improved wire wheel cover is taught which utilizes fewer parts and consequently has less weight than those shown in the prior art.

2. Description of the Prior Art

Simulated spoke wire wheel covers are known and have been widely used in the art. These devices exemplified in U.S. Pat. Nos. 2,710,775 and 3,174,803. The former patent discloses looped spokes which are individually fixedly fastened to hub member and wherein successive spoke members are provided with integrally threaded openings for receiving threaded fasteners which extend inwardly from an intermediate flange to the trim ring.

The latter patent discloses a simulated spoke wheel cover wherein hair pin or reentrant bent spokes are secured between a radial flange portion located centrally of the wheel cover and apertures located on a radially inwardly facing flange of a generally annular inner plate.

U.S. Pat. No. 4,229,048 discloses a simulated wire wheel cover utilizing hair pin bent spokes held in position by the clamping force between the hub and a mounting plate. The radially inner ends of the spokes are clamped between the hub and the mounting plate and radially outer ends of the spoke are located in a flange on the mounting plate.

U.S. Pat. No. 4,178,043 to Hans R. Beisch et al dated Dec. 11, 1979, discloses a similar design in that by the clamping action of the hub and a base member. A flange on the base member provides the support for the radially outer ends of the spokes.

U.S. Pat. Nos. 4,168,016 and 4,221,436 to Claude Marshall dated Sept. 18, 1979, and Sept. 19, 1980, disclose a similar arrangement utilizing the clamping forces between a hub member and a body portion to maintain the spokes in position. However, this patent further discloses the use of a conical camming surface to provide a radial force on the spoke members to ensure positive engagement of the radially outer ends of the spoke member with the base member.

As will be set forth herein, the structural integrity of the wire wheel cover of the present invention results not from any base member or the clamping forces between a central hub member and a base member but from the structural interconnection between the spoke members during fabrication of the wheel cover. This method of construction results in a simulated wire wheel cover which is much lighter and far more economical to produce than those of the prior art.

SUMMARY OF THE INVENTION

It is an object of this invention to provide for a lightweight simulated wire wheel cover.

It is a further object of this invention to provide a simulated wire wheel cover which has a high degree of structural integrity.

It is yet an additional object of this invention to provide a wire wheel cover in which the structural integrity is provided by at least one integral array of spokes.

It is still a further object of this invention to provide a simulated wire wheel cover wherein the integral array of spokes is formed by resistance welding the spokes together at the time of assembly with the hub and rim members of the wheel cover.

It is yet a further object of this invention to provide a wheel cover in which some of the spoke members are supported by the integral array of spoke members formed by the welding operation.

It is yet another object of this invention to provide a simulated wire wheel cover which while having high structural integrity is extremely economical to manufacture.

These and other objects of the invention are disclosed in the preferred embodiment of the invention which includes a simulated wire wheel cover which has a circular rim member. The circular rim member is held in position by the outer ends of a spoke array. The spoke array is composed of a plurality of interconnected spoke members. A central hub member is provided and is fastened to the central portion of the spoke array. The circular rim member has a plurality of wheel retention means attached thereto. These and other objects of the invention will become apparent from the following description of the following drawings.

DESCRIPTION OF THE PREFERRED EMBODIMENT

Figure 1:
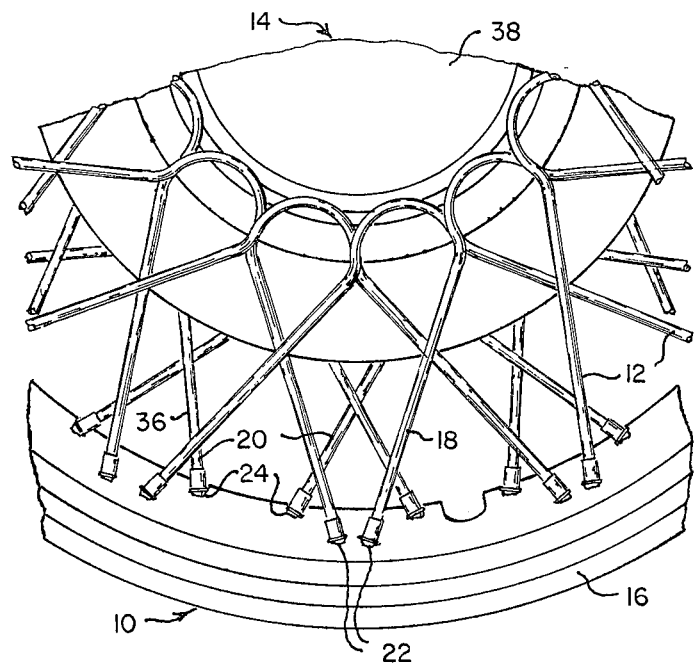
FIG. 1 is a view of a portion of a simulated wire wheel cover in accordance with the present invention as viewed when looking in an axially inward direction and having portions thereof partially broken away.
Figure 2:
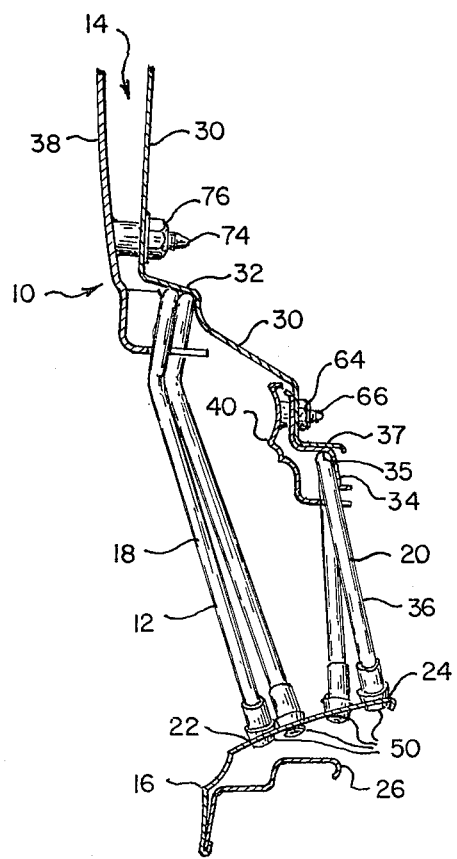
FIG. 2 is a sectional view of the preferred embodiment of the present invention taken along the line A—A of FIG. 1.

FIGS. 1 and 2 disclose a simulated wire wheel cover of the present invention. The simulated wire wheel cover generally designated as 10 is composed of an integral array of spokes 12, a hub member generally denoted as 14 and a rim member 16.

The preferred spoke array 12 is composed of a plurality of individual spokes 18, the method of forming the spoke array 12 from the plurality of individual spokes 18 will be described in greater detail below. In the preferred embodiment a second array of spokes 20 composed of individual spoke members 36 is provided to enhance the aesthetic characteristics of the wheel 10. The preferred spokes 18 and 36 are formed of hollow tubular material.

In the preferred embodiment, the annular rim 16 is provided with a first and second series of holes therethrough 22 and 24, respectively, the function of which will be described in further detail below. It can be seen in FIGS. 1 and 2 that the first series of holes 22 are slightly canted with respect to the annular rim portion 16 while the second series of holes 24 are canted at a greater angle with respect to the rim portions 16 and the first series of holes 22.

The preferred wheel rim portion 16 utilizes a conventional retention means 26 which may have a scalloped or other formed section to grab the inner flange of a vehicle wheel (not shown). The retention means 26 is fixedly attached to the rim portion 16. Any one of a wide variety of retention means 26 may be used to hold the wheel cover 10 to a vehicle wheel.

In the preferred embodiment, the hub assembly generally denoted by 14 of the wheel cover 10 is composed of a plurality of elements which are clamped around and supported by the spoke array 12. The axially inner element 30 of hub assembly 14 is provided with a first circular camming surface 32. The first circular camming surfaces 32 may be formed in the shape of a truncated conical surface. This feature can best be seen in FIG. 2 and will be described in greater detail below.

In the preferred embodiment, the wheel cover 10 has assembled within it two arrays of generally V-shaped spokes 12 and 20 as indicated above. The first array of spokes 12 has a greater length than the second array of generally V-shaped spoke members 20. The specific number of individual spokes 18 and 36 which comprise the arrays 12 and 20 is determined based upon the desired aesthetic effect.

In the preferred embodiment the spokes 36 of the array 20 are not interconnected one to another but are held in position by the clamping force generated between a shroud 34, hub member 30 and the circular clamping member 40. The inner hub portion 30 in turn is supported by the clamping force generated between the member 30 and the clamping member 38 around the integral array of spokes 12.

Referring now to the simulated wire wheel 10 shown in FIG. 2, the preferred method of fabrication will be described. The first step in the fabrication process is to place a rim member 16 and the shroud member 34 in a support fixture (not shown). The next step is to insert the ends of spokes 36 in the holes 24 of rim member 16 and onto a camming surface 35 of shroud 34. The camming surface 35 is similar in concept to camming surface 32 of hub member 30. If desired, spokes 36 can be resistance welded to the shroud member 34 to form spoke array 20. However, in the preferred embodiment the spokes 36 are not welded at this point. With the spokes 36 all inserted, the circular clamping member 40 is placed on the spokes 36.

The substantially V-shaped spoke members 18 and 36 are provided with outwardly facing conical shaped stop means 50 at each end thereof to limit the travel of said spoke members through said holes in said rim. The conically shaped stop means are formed from the material of the generally V-shaped spoke members and may be an upset portion thereof. The stop means 50 are in intimate contact with the annular surfaces defining the angularly canted holes 22 and 24.

Pressure is then exerted on clamping member 40 so that the spoke members 36 move in the axially inward direction along conical camming surface 35 and into positive engagement with the wheel rim 16. Means generally denoted as 54 are provided to supply the clamping action of the circular clamping member 40 and the shroud member 34 about the spoke array 20.

The means 54 may be a screw or a nut and stud arrangement as will be described later.

In the preferred method the next step is to insert a plurality of spokes 18 into the holes 22 of rim 16 and onto the camming surface 32 on hub member 30. The pressure is then exerted in the axially inward direction against the array of spokes 12 to move the apex of each of the spokes 18 along the conical camming surface 32 and into positive engagement with the wheel rim 16. While the pressure is maintained, each of the plurality of spoke members 18 is resistance welded to the adjacent spoke member at the point where the members lie one on another.

The clamping member 38 of hub assembly 14 is then assembled to the hub member 30 and clamped around the now integral spoke array 12 to provide for the structural support of the member 30.

In the preferred method the support fixture is provided with a central portion having the shape of hub member 30 but made of much heavier material which supports the spoke members during the assembly process. It can be seen that the shroud 34 can be eliminated if hub member 30 is utilized in the first step of the process rather than the shroud member 34. The spokes 36 would then engage the camming surface 37 of hub member 30. The support fixture would have to provide support for hub member 30 so that it remains rigid during the assembly process.

Figure 3:
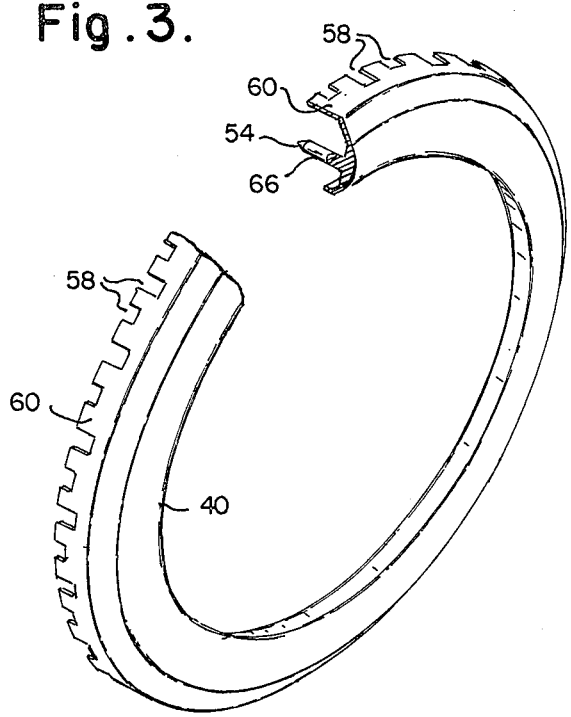
FIG. 3 is an isometric view of the clamping means of FIG. 1 with a portion cut away.
Figure 5:
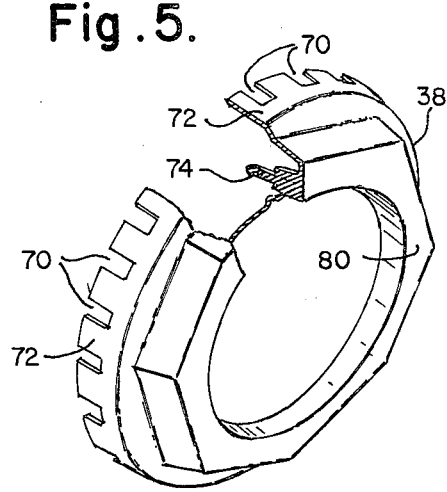
FIG. 5 is an isometric view of another clamping means of FIG. 1 with a portion cut away.
Figure 7:
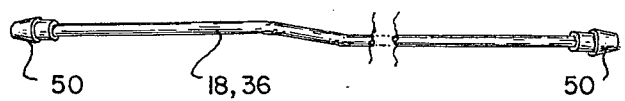
FIG. 7 is a top plan view of the larger V-shaped members of FIG. 1.

As can be seen from above, the generally V-shaped members 36 of spoke array 20 are mechanically fixed within the wheel cover 10 by the assembly of the circular clamping member 40. The circular clamping member 40, which can best be seen in FIG. 3, is provided with a series of notches 58 in its axially depending circular lip 60. The clamping member 40 therefore captures in each of it's notches 58 each leg of the V-shaped spoke array 20. When the clamping member 40 is attached to the inner hub portion 30 by suitable fastening means generally denoted as 54 such as a nut 64 threadedly attached to a threaded stud 66, it will force the the apex of V-shaped spokes 36 axially and down the circular camming surface 35. This action results in the generally V-shaped spoke member 36 being driven towards the rim portion 16. As the generally V-shaped member 36 is so driven toward the rim portion 16, the conical stop means 50 will come into intimate contact with the rim 16 thereby effectively locking each of the generally V-shaped members in place on the wheel cover 10. As can be seen, the structural support for the spoke array 20 and hub member 30 is the integral array of spokes 12. Consequently, the array 20 could be eliminated if the detriment to the appearance of the wheel cover were of no concern.

The clamping member 38 performs a different function than the clamping member 40. While it is provided with a series of notches 70 on axially depending circular lip 72, its function is not to drive spokes 18 axially outward into engagement with the rim 16. Rather its function is to securely fasten hub member 30 to the welded spoke array 12. Hub member 30 is provided with a conical camming surface 32 to ensure the rigidity of the hub member 30 within the wheel cover. Clamping member 38 is provided with a stud 74 and a nut 76 as a means for providing the clamping forces which secure hub member 30 to the welded spoke array 12. As the clamping member 38 is assembled to the spoke array 12 by the threaded studs 74 and the nut 76, the notches 70 contact the spoke array 12 forcing hub member 30 into tight engagement with the array as the nut 76 is tightened thereby moving the spokes along conical surface 32. As an alternate method, the clamping member 38 or shroud 40 may be provided with a threaded boss to accept a threaded stud thereby providing the clamping force.

The clamping member 38 may also be provided with a decorative design such as a simulated nut 80 or other suitable decorative design or styles.

Figure 8:
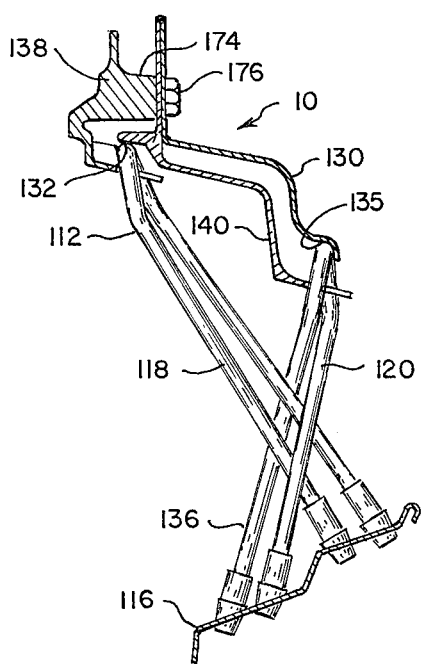
FIG. 8 is a sectional view of a second embodiment of the present invention taken along the lines A—A of FIG. 1.
Figure 4:
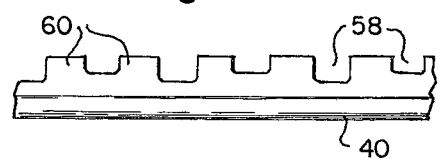
FIG. 4 is a partial top plan view of the clamping means of FIG. 3.
Figure 6:
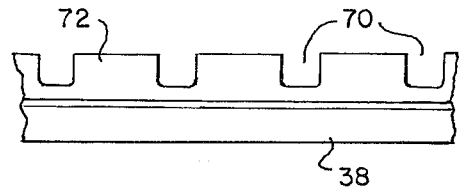
FIG. 6 is a partial top plan view of the clamping means of FIG. 5.

An alternate embodiment of the wheel cover 10 is disclosed in FIG. 8. The alternate embodiment is composed of two spoke arrays 112 and 120 composed of spoke members 118 and 136, respectively. The radially outer ends of the spoke are engaged with a wheel rim 116. A hub portion 138 supports the spoke array 120 in conjunction with the clamping member 140. The inner hub member 130 has a conical camming surface 135 which forces spokes 136 of spoke array 120 into engagement with the rim 116 identical to the manner described for the preferred embodiment above. In addition, camming surface 132 of clamping member 140 is extended axially outward to engage the inner ends of spoke array 112. Again, camming surface 132 forces spokes 112 into engagement with rim 116. The central hub portion 138 of the wheel cover 10 further includes a threaded boss 174. A screw 176 is utilized to clamp members 130, 140 and 138 onto spoke array 112. The member 140 has a conical surface, which as described above for the preferred embodiment, ensures the rigidity of the support structure.

The method of assembly of the embodiment shown in FIG. 8 is similar to that shown for the preferred embodiment in that a fixture is used to support the spokes prior to welding of the array 112. The members of the hub portion 130, 140 and 138 are then assembled to provide a rigid structure.

It should be noted that in either of the embodiments shown in FIG. 2 or FIG. 8, the spoke array 20, 120 may also be welded one to another where each spoke member 36, 136 comes in contact with the adjacent spoke member. This would provide a structure which is even more rigid than that previously described. In addition, the spokes of array 20, 120 may be welded to the hub member 30, 130 where the apex of members 36, 136 come in contact with hub member 30, 130. Again this would provide a more rigid structure than that previously described.

As beforementioned, the specific number of substantially V-shaped members 18 and 36 in a particular array may be varied based upon the desired aesthetic effect. Further, the simulated wire members 18 or 36 may be changed in overall configuration also depending upon the aesthetic effect.

It can be seen from the above that the simulated wire wheel cover is generally simplistic in design and is susceptible to inexpensive, high volume techniques using simplistic tools, dies, jigs and fixtures. Also, the resistance welding of tubular parts, such as the tubular material of spokes 18 and 36 is well known in the welding art. The selection of the material for the various parts will depend upon environment, application and the desired aesthetic appearance. Of course, the choice of material for the spokes would depend upon the weldability of the tubular material. For example, all the various component parts could be made from a wide range of material including stainless steel, aluminum or even molded plastic or zinc die casting. In that regard the overall aesthetic appearance of the wheel cover 10 can be greatly altered by the restyling of the exterior of the clamping member 38. Of course, the spoke material of array 12 must be capable of resistance welding In any event, it should be understood that the specific construction and above noted details of the improved wheel cover herein disclosed and described are presented for the purpose of explanation and illustration and are not intended to limits of the invention, the scope of which is defined by the following claims.

I claim:

1. A simulated wire wheel cover comprising: a circular rim member; a spoke array composed of a plurality of interconnected spoke members welded to one another at the point where end spoke member comes in contact with the adjacent spoke member in said array; the radially outer end of said spoke array capable of engaging and positioning said circular rim member, said rim member provided with holes to receive the radially outer end of said spoke members; a center hub member fastened to and supported by the central portion of said spoke array; and wheel retention means attached to said rim member.

2. The simulated wire wheel cover as set forth in claim 1 wherein each of said spoke members are generally V-shaped.

3. The simulated wire wheel cover as set forth in claim 1 wherein each of said adjacent spoke members is welded by resistance welding.

4. The simulated wire wheel cover as set forth in claim 1 wherein each of said generally V-shaped spoke members is made out of tubular material.

5. The simulated wire wheel cover as set forth in claim 1 wherein said hub member and said rim member support a second plurality of generally V-shaped spokes.

6. The simulated wire wheel cover of claim 5 wherein said second plurality of generally V-shaped spokes are welded to said hub member.

7. The simulated wire wheel cover as set forth in claim 5 wherein said second plurality of substantially V-shaped spoke members are placed about said hub member one on another to form a substantially conical array with each spoke member welded to each adjacent spoke member at the point where they come into contact.

8. The simulated wire wheel cover as set forth in claim 2 wherein said hub is provided with a truncated conical camming surface in the region of the apex of each of said generally V-shaped simulated spoke members, said apex of said spoke members contact said truncated conical camming surface, whereby an axial force on spoke members moves said apex along said truncated conical camming surface and drives the ends of said spokes into positive engagement with said rim member immediately prior to the welding of said spoke array.

9. The simulated wire wheel cover as set forth in claim 8 wherein the ends of said generally V-shaped simulated spoke is provided with a stop means including upset portions to limit the travel of said spoke members through said holes in said rim.

* * * * *